United States Patent [19]
Yokomizo

[11] Patent Number: 5,570,461
[45] Date of Patent: Oct. 29, 1996

[54] IMAGE PROCESSING USING INFORMATION OF ONE FRAME IN BINARIZING A SUCCEEDING FRAME

[75] Inventor: Yoshikazu Yokomizo, Yokohama, Japan

[73] Assignee: Canon Kabushiki Kaisha, Tokyo, Japan

[21] Appl. No.: 605,623

[22] Filed: Feb. 22, 1996

Related U.S. Application Data

[63] Continuation of Ser. No. 236,098, May 2, 1994, abandoned.

[30] Foreign Application Priority Data

May 14, 1993 [JP] Japan ................................. 5-113003

[51] Int. Cl.$^6$ ............................................... G06T 5/00
[52] U.S. Cl. ......................... 395/135; 395/133; 395/152
[58] Field of Search ................................... 395/129, 131, 395/133–139, 152; 358/78, 456, 518; 345/148

[56] References Cited

U.S. PATENT DOCUMENTS

5,119,186  6/1992  Deacon et al. ............................ 358/78
5,254,982 10/1993  Feigenblatt et al. ..................... 345/148
5,278,678  1/1994  Harrington ............................... 358/518
5,331,429  7/1994  Levien ..................................... 358/456

*Primary Examiner*—Almis R. Jankus
*Attorney, Agent, or Firm*—Fitzpatrick, Cella, Harper & Scinto

[57] ABSTRACT

An image processing apparatus eliminates problems encountered in binarizing processing when an A/D-converted multivalued frame image is entered continuously and the image is displayed continuously on a binary-image display device. In terms of binarizing processing, the error-diffusion method provides excellent results. However, when processing according to this method is applied as is to each frame image, rapidly shifting noise is produced on the display screen owing to the A/D conversion characteristics, etc. This occurs because individual frames are binarized independently. The invention reduces the occurrence of this noise by making the present frame of data reflect the preceding frame of data, i.e., by applying hysteresis of image data of the preceding frame to image data of the present frame when the present frame is binarized.

26 Claims, 8 Drawing Sheets

PIXEL OF INTEREST

FIG. 4B

PIXEL OF INTEREST

IMAGE PROCESSING USING INFORMATION OF ONE FRAME IN BINARIZING A SUCCEEDING FRAME

This application is a continuation of application Ser. No. 08/236,098 filed May 2, 1994, now abandoned.

BACKGROUND OF THE INVENTION

This invention relates to an image processing apparatus and method and, more particularly, to an image processing apparatus and method for displaying image data on a device, such as an FLC (ferrodielectric liquid-crystal device) having a comparatively small number of reproducible tones.

CRT monitors used in modern computers and the like are analog devices capable of expressing half-tone colors beautifully. Devices of this kind are capable of displaying motion pictures in excellent fashion in recent multimedia applications.

Binary-image display devices such as FLCs extract a digital signal from a computer and subject the signal to appropriate binarization processing, thereby making possible highly attractive pseudo-half-tone expression.

In a configuration in which an FLC is connected to a computer, it is required that the connection be made via an analog interface having compatibility with an existing analog CRT monitor. However, quantization noise is produced by the A/D converter circuit, and the size and position of the noise change between frames.

Consequently, when binarization is performed by the error diffusion (ED) method, the state of error diffusion varies temporally between frames, as a result of which the pattern of noise intrinsic to the ED circuitry darts about on the display screen over multiple frame sequence. This results in an annoying and highly unattractive display. In an effort to solve this problem, the conventional practice is to perform binarization using the dither method, without relying upon the ED method. However, a drawback with the dither method is that slender portions of the image tend to blur.

Thus, there is need for development of a method in which noise will not appear in spite of using the ED method, which is held to be the best method for producing still pictures.

SUMMARY OF THE INVENTION

First Principle

It is a well-known fact that the ED method is one of the best for a situation in which multivalued image data is displayed on a binary device. When the ED method is applied to each frame of a motion picture, however, the appearance of the error-diffusion pattern changes from frame to frame, resulting in a very unattractive display. Accordingly, the present invention is such that when a frame currently undergoing processing is binarized, the probability that an error-diffusion pattern the same as that of the preceding frame will appear is raised while reference is made to information that has been obtained by binarizing the preceding frame. As a result, the change in pattern from frame to frame is held to the minimum in order to reduce the occurrence of rapidly shifting noise.

Means

According to the invention, a density-error preserving circuit, which is part of the binarization circuitry in an ED system, is provided with an adder circuit for summing signals obtained by multiplying the result of binarization of the preceding frame by a certain coefficient.

Effects

The appearance of error-diffusion noise is rendered constant with time, as a result of which rapidly shifting noise becomes unnoticeable.

Second Object

The above-mentioned problem of noise ascribable to the ED method does not arise in a case where an input is a digital motion-picture signal. When the input is an analog motion-picture signal and this is A/D-converted, resulting in quantization noise, a problem arises as a result of binarizing this noise by ED. According to the invention, this problem is solved by minimizing quantization noise.

Means

According to the present invention, information, which has been binarized in the preceding frame, is preserved when an analog motion-picture signal is binarized. When, on the basis of this information, it is found that data currently being binarized is in the gray zone of a binarization slice level, the probability of binarization to a value the same as that of the preceding frame is raised, thereby minimizing the change in quantization noise with time.

Effects

In a case where an analog signal is A/D-converted to a digital signal, circuit operation can be stabilized by applying a small amount of hysteresis. By hysteresis is meant a small amount of positive feedback. According to the invention, effects of the kind brought about by applying hysteresis from one frame to the next are obtained, as a result of which a change in quantization noise with time is reduced.

Accordingly, an object of the present invention is to provide an image processing apparatus in which it is possible to greatly reduce noise produced when image data enters continuously in frame units and the image data is displayed by an N-value display device.

Another object of the present invention is to provide an image processing apparatus in which the occurrence of noise on a display screen can be suppressed and an attractive image displayed in an arrangement wherein frame images outputted continuously as analog signals are converted into digital data and the digital data is displayed on an N-value display device.

Still another object of the present invention is to provide an image processing apparatus in which it is possible to display an attractive, low-noise image in an arrangement wherein a frame image based upon an analog signal is displayed on a device to which M-value digital data is applied as an input and the digital data is displayed as an N-value image.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Embodiments of the present invention will now be described in detail with reference to the accompanying drawings.

First Embodiment

In order to simplify the description, an example will be described in which an input pixel (VIDEO signal) has already been converted into eight bits (256 tones) by an A/D converter, not shown.

Figure 1A:
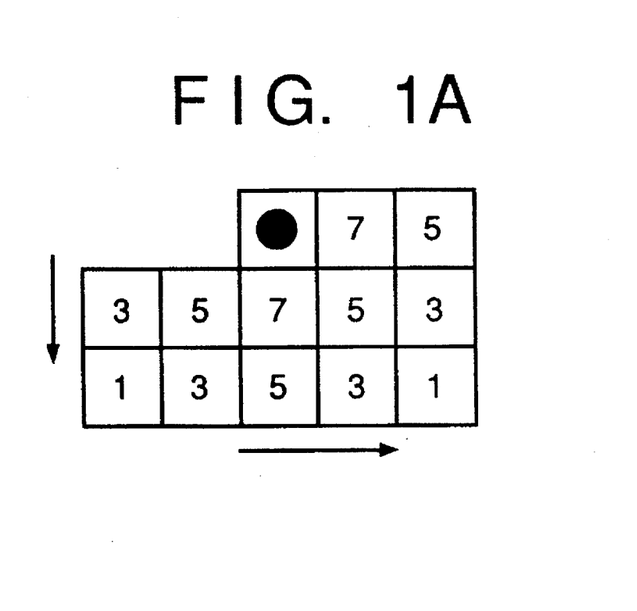
FIG. 1A is a diagram illustrating an error-diffusion matrix of an error-diffusion filter according to a first embodiment of the present invention.
Figure 1B:
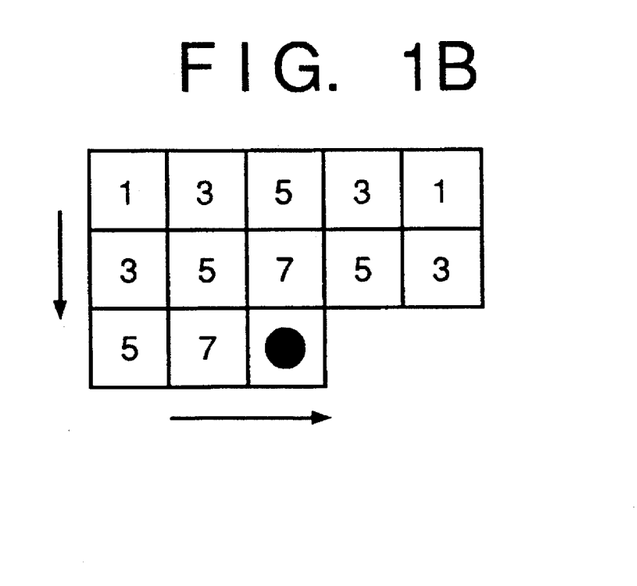
FIG. 1B is a diagram illustrating an error-diffusion matrix of an error-diffusion filter according to a first embodiment of the present invention.

FIGS. 1A, 1B are diagrams for describing an error-diffusion filter (mask) according to this embodiment. In FIGS. 1A, 1B, horizontal arrows indicate the processing direction at the end of processing of one pixel, and the vertical arrows indicate the direction of the next line in a case where processing has advanced by one scan.

FIG. 1A illustrates a diffusion matrix for binarization error in a case where a pixel of interest (the position of the black circle) is binarized. The numerical values within the matrix indicate weighting coefficients for diffusion of error to neighboring pixels not yet binarized. In this case, the total of the weighting coefficients adds up to "48". Therefore, by way of example, an error of "E×7/48" of a binarization error "E" produced at the position of the pixel of interest is distributed to the positions of unbinarized pixels the weighting coefficient of which is "7".

FIG. 1B illustrates an error-diffusion filter used in an actual circuit. This filter is employed since it is easy to build in an arithmetic circuit. This filter is employed in the apparatus of this embodiment as well. In terms of operation, an already generated error in an adjacent pixel is distributed to the position of a pixel of interest (the position of the black circuit in FIG. 1B). Errors stored at the positions of already binarized pixels are added up in accordance with the respective weighting coefficients, and the result is added to VIDEO data (not shown) at the position of the pixel of interest entered externally. For example, from the position of the pixel whose weighting coefficient is "5", a value of "5/48" of the binarization error E produced at the position of this pixel is added to the VIDEO data of the position of the pixel of interest. Other errors already binarized are dealt with in the same manner.

It should be noted that the error-diffusion methods described above are well-known art and need not be described any further.

Next, the operation of an apparatus for binarizing and outputting a multivalued motion picture in this embodiment will be described with reference to FIG. 2.

Figure 2:
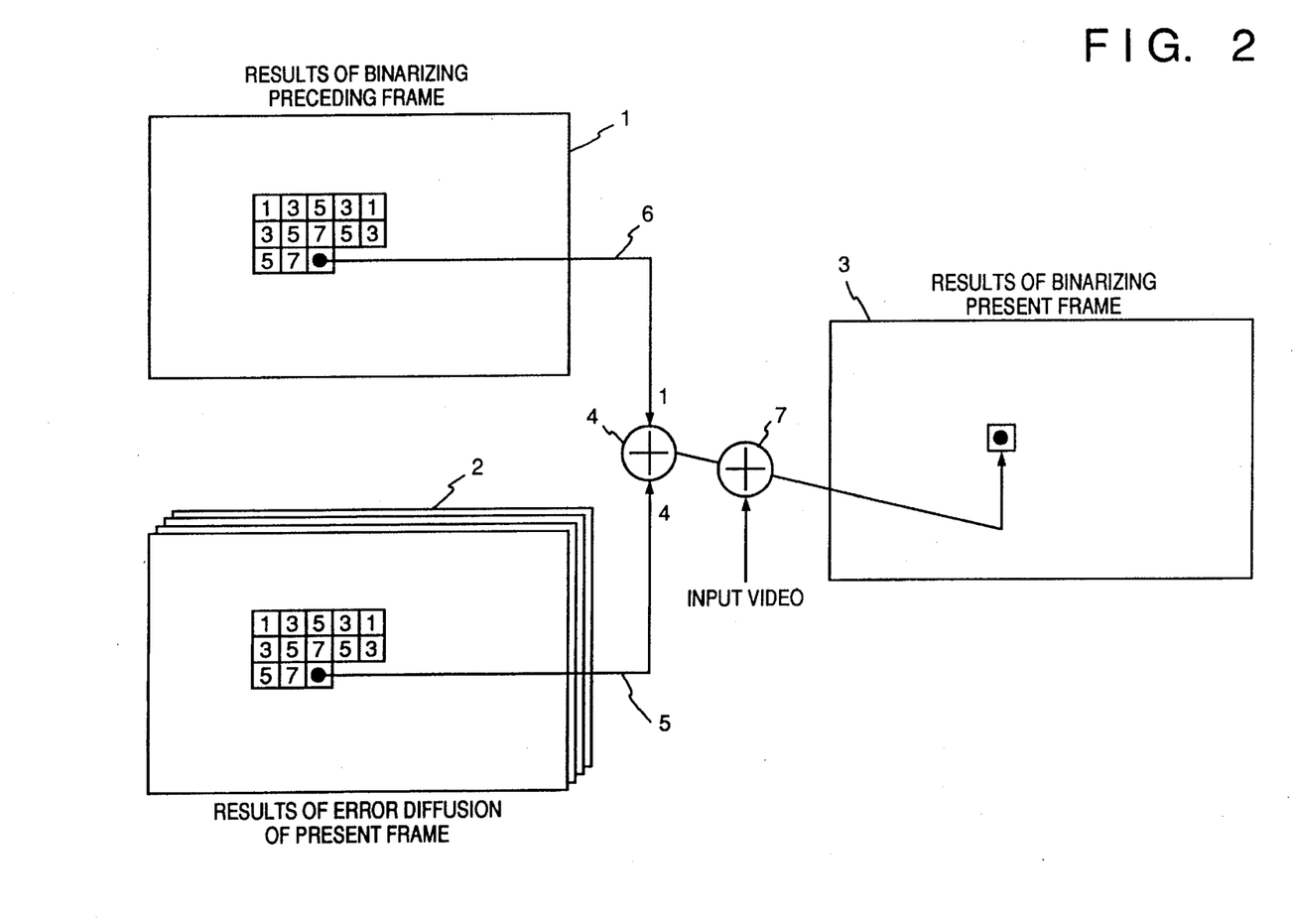
FIG. 2 is a diagram for describing the gist of interframe error diffusion processing according to the first embodiment.

In FIG. 2, numeral 1 denotes a binary memory for storing, as single bits, the results of binarizing each pixel of a preceding frame, 2 a multivalued memory storing the error of a frame currently being processed, 3 a binary memory for storing the results of binarizing the frame currently being processed, and 4 and 7 adders.

In order to obtain error-diffusion coefficients (values added to the pixel of interest) of the present frame, the error-diffusion filter of FIG. 1B is applied, with the pixel of interest of memory 2 serving as the center, and an output 5 is applied. At the same time, the same error-diffusion filter is used with regard to the position of the same pixel of interest in binary memory 1, which stores the results of binarizing the preceding frame.

In the memory 1, one bit of the memory stores only "0" or "1", as a matter of course. If the status of the bit is "1", the diffusion coefficient from the preceding frame is obtained as "255". If the status of the bit is "0", the diffusion coefficient from the preceding frame is obtained as "0". As a result, an essentially accurate error-diffusion coefficient 6 (the value of which is a value of 0–255) can be obtained from the memory 1 storing the data of the preceding frame. These error-diffusion coefficients 5, 6 are added together at a fixed ratio by the adder 4, and the resulting sum is then added to the data of the position of the pixel of interest by the adder 7. Binarization is performed by comparing the resulting sum with a predetermined threshold value (generally "128").

In order for the adder 4 to add up the diffusion-error coefficients 5, 6 at a fixed ratio, a multiplier is usually required. If the ratio is a specific ratio, this can be achieved by a bit shifting operation. For example, when the noise contained in the present frame has a level on the order of 20 dB, the signals 5 and 6 should be added at a ratio of 4:1. In other words, the adder 4 shifts the error-diffusion coefficient 5 by two bits in the direction of the higher order bits, and the result is added to the coefficient 6.

By adding the error-diffusion coefficient 6 obtained by the results of binarizing the preceding frame to the error-diffusion coefficient 5 of the present frame, the following outstanding effects can be obtained:

By adding part of the error-diffusion coefficient of the preceding frame, a binarization pattern similar to that of the preceding frame is obtained, even if the image signal of the present frame contains noise.

In order to simplify the description, it will be assumed that the nearer the value is to "255", the closer to black the pixel is.

By way of example, imagine a case in which one pixel takes on a half-tone of 0 to 255 and no consideration is given to the preceding frame. Further, imagine a case in which "80" is the value (VIDEO) of the density level owing to noise at the pixel of interest, of the present frame, corresponding to the position of a pixel, in the preceding frame, judged to have been binarized to, say, "black" (by convention, solid red, solid blue and solid yellow also are expressed as black). If the cumulative error is "20" in such case, then the total will be "100". Since this does not satisfy the slice level (threshold value) of "128", this pixel of interest would be binarized as 0, namely "white". The error "+100 (=100−0)" resulting from 0 binarizing 100 to 0 is added at binarization of the next pixel. The next pixel, therefore, is readily discriminated as being "black". Accordingly, the position of a "black" pixel discriminated one frame earlier is readily displaced by at least one pixel owing to the effects of noise.

If the diffusion error of the preceding frame is added at a fixed ratio, e.g., 4:1, as in the present invention as set forth above, "75", which is three-fourths of 100, and "64", which is one-fourth of 256, will be added and, as a result, the value of the pixel of interest will be $$(100 \times \tfrac{3}{4}) + (256 \times \tfrac{1}{4}) = 139$$

so that "black" will be discriminated. Consequently, the error resulting from binarizing 139 to 255 is 139−255=−116. Since a large negative numerical value is added to the next pixel, the possibility that the next pixel will be discriminated as being "white" is very high.

Figure 3:
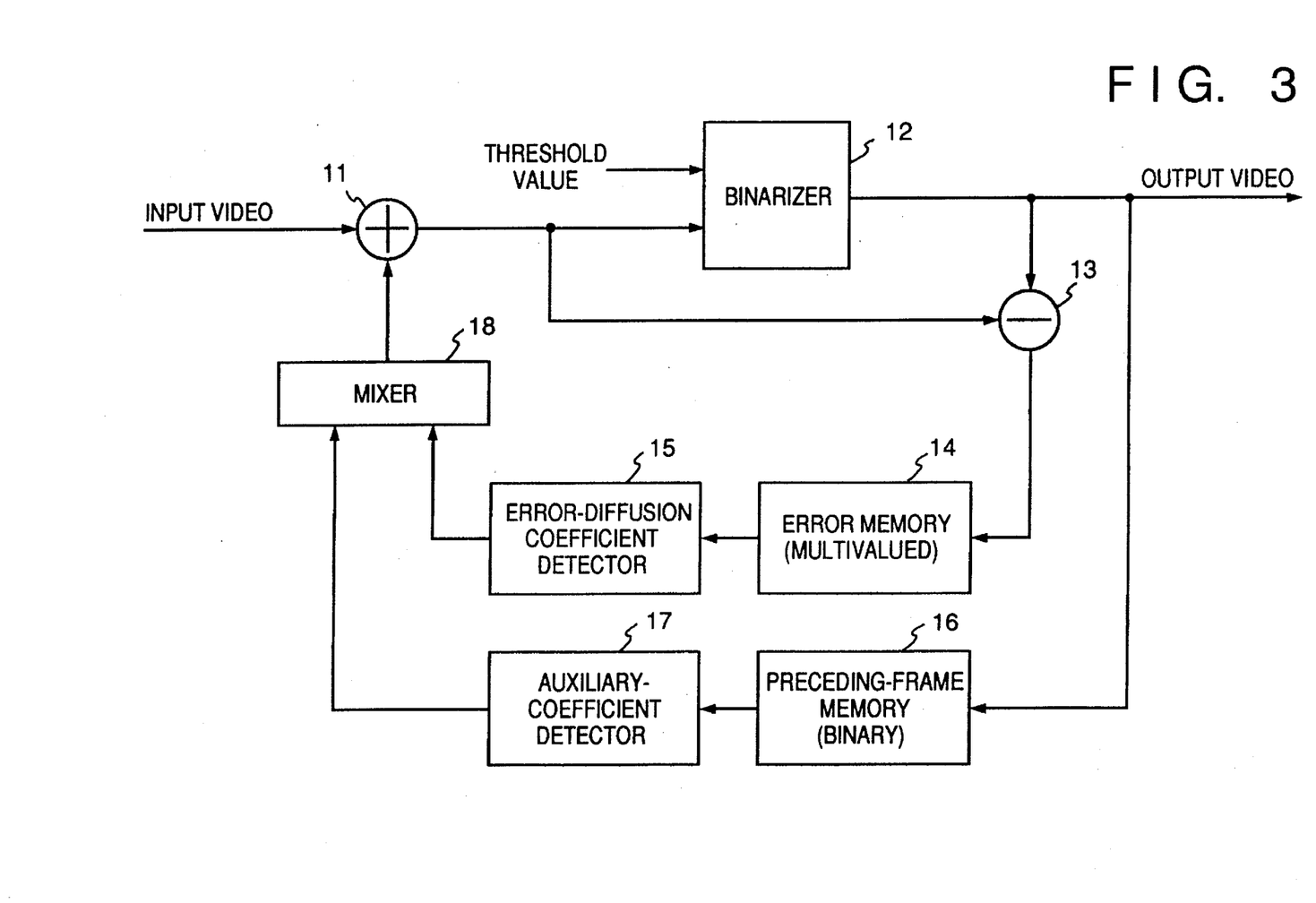
FIG. 3 is a block diagram illustrating an apparatus according to the first embodiment.

A specific arrangement for realizing the above-described processing is as depicted in FIG. 3.

As shown in FIG. 3, an adder 11 (which corresponds to the adder 7 in FIG. 2) adds a diffusion coefficient to the data of a pixel of interest applied thereto as an input. A binarizing unit 12 performs binarization by comparing the pixel data outputted by the adder 11 with a predetermined threshold value (=128). The output of the binarizing unit 12 is binary data based upon a pseudo-half-tone image.

An RTU subtractor 13 calculates the difference between the output of the binarizer 12 and the pixel data immediately before it is binarized, thereby calculating the error generated. It should be noted that whereas the binarizer 12 outputs a binary signal that is literally a "0" or a "1", the subtractor 13 outputs "0" when this binary signal is "0" and "255" when the binary signal is "1".

An error memory 14 stores the error produced by the subtractor 13. Here eight bits (with signs) are allocated to one pixel. An error-diffusion coefficient detecting circuit 15 calculates diffusion coefficients with respect to the position of a pixel of interest in accordance with the matrix illustrated in FIG. 1B.

A preceding-frame memory 16 stores the binarized signal. A practical problem is that binarized signals (single bits) of the entirety of a preceding frame are stored literally in the preceding-frame memory 16 before the present frame is binarized. However, the binarized data of the preceding frame and the binarized data of the present frame are mixed during the time that the present frame is undergoing binarizing processing.

An auxiliary-coefficient detecting circuit 17 obtains the diffusion-coefficient signal 6 of the preceding frame, described earlier. A mixer 18 corresponds to the adder 4 in FIG. 2.

It should be noted that this circuitry is not drawn to show a frame memory (denoted by numeral 3 in FIG. 2) that stores the output VIDEO obtained by binarization.

Further, in the description given above, pure white is expressed as "0" and pure black as "255" with regard to the value of the VIDEO input. However, pure black may be expressed as "0" and pure white as "255" if desired.

Second Embodiment

Figure 4A:
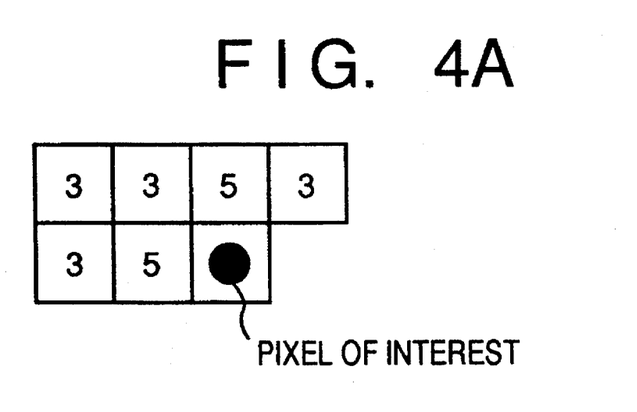
FIG. 4A is a diagram illustrating a diffusion matrix of a preceding frame according to a second embodiment of the present invention.
Figure 4B:
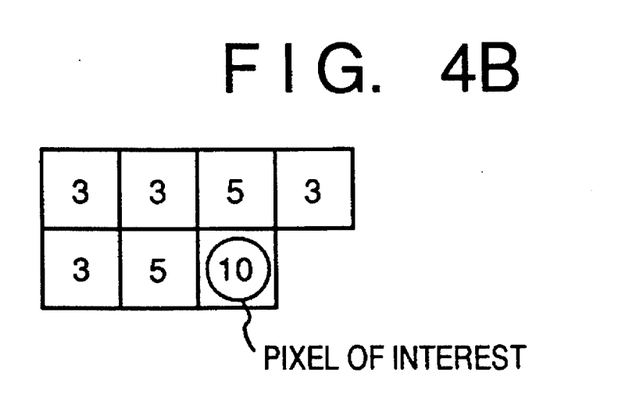
FIG. 4B is a diagram illustrating a diffusion matrix of a preceding frame according to a second embodiment of the present invention.
Figure 5:
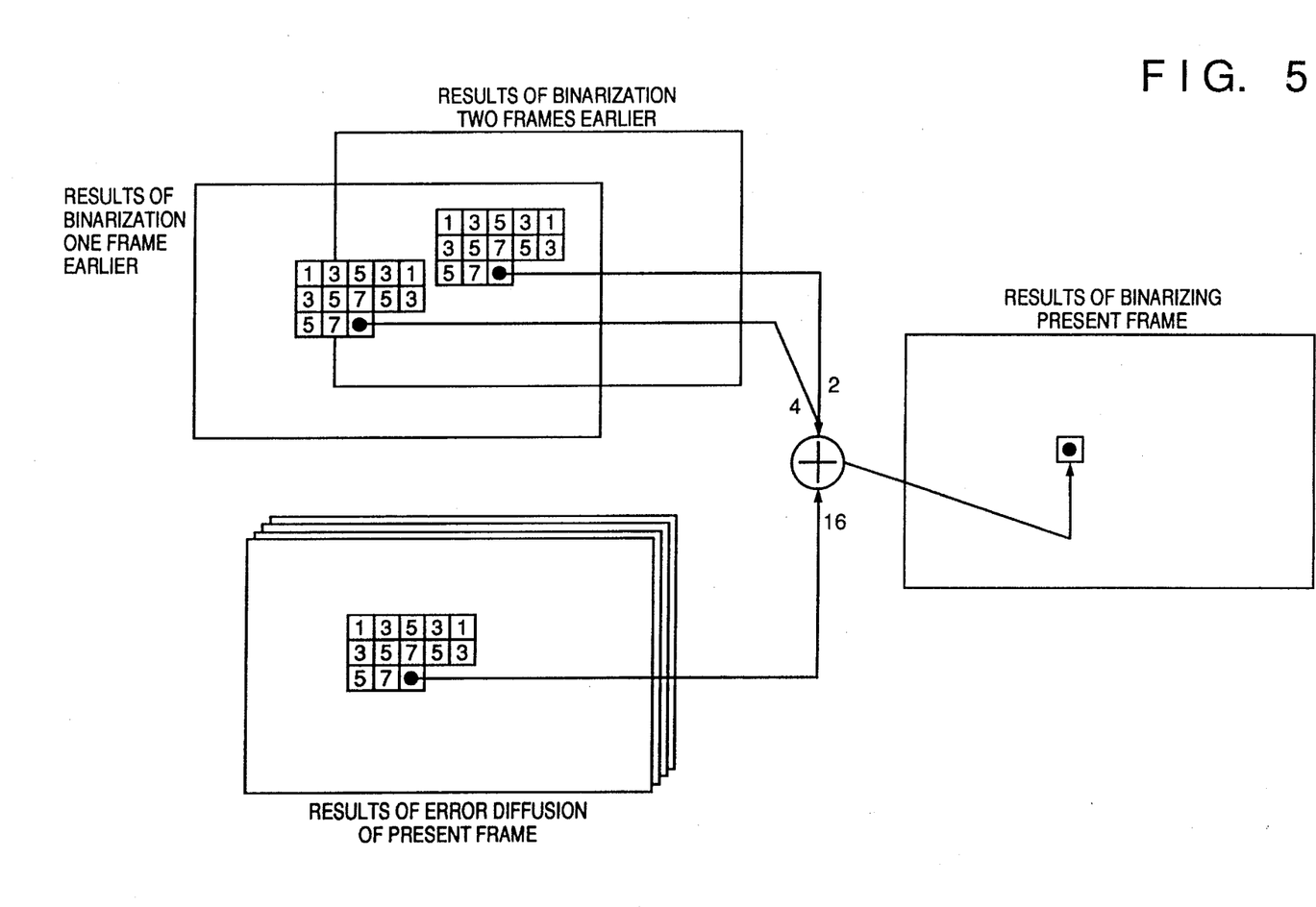
FIG. 5 is a diagram for describing the gist of interframe error diffusion processing according to the second embodiment.

In the first embodiment set forth above, the error-diffusion filter applied to the output of the preceding-frame memory 16 is the same as the filter for obtaining diffusion coefficients from the present error memory. However, the inventor knows that a smaller filter provides greater effects, as in FIG. 4A. Further, the same effects are obtained merely by changing only addition ratios without using any filter at all. Setting the value solely of the pixel of interest itself (in the preceding frame) as a diffusion coefficient provides major effects, as in FIG. 4B.

Furthermore, the frame memory need not be that for a single page. It will suffice if the frame memory is useful for calculating error from the information of the two preceding frames and discriminating binarization of the present pixel of interest. In such case, excellent results are obtained if diffusion coefficients calculated from the picture two frames earlier are multiplied by coefficients smaller than diffusion coefficients calculated from the picture one frame earlier and the resulting values are added to the diffusion coefficients of the present pixel of interest.

Thus, as described above, the present invention is directed to dealing with a shortcoming encountered in the prior art. Specifically, when a motion picture is displayed by the error-diffusion method on a display device, such as an FLC display device, having only a two tone expression capability or a small number of reproducible tones, noise between frames in an analog transmission system influences error diffusion, as a result of which there is a temporal change in the dot pattern peculiar to the error-diffusion method. This produce an serious effect as if the error diffused pattern like a bunch of bugs move on the display in the time span. This causes the presentation of an extremely unattractive display. The present invention is capable of mitigating this drawback by raising the probability that a pixel judged to be "black" one frame earlier is judged to be "black" in the present frame and, similarly, by raising the probability that a pixel judged to be "white" one frame earlier is judged to be "white" in the present frame.

In this embodiment, no particular description is given with regard to color components. However, it goes without saying that a color image may be processed in a similar manner. In such case, even if processing is executed for each plane of R, G, B, a conversion is made temporarily to brightness and chromaticity, which are then subjected to processing. Thereafter, R, G, B are restored and outputted.

Third Embodiment

A third embodiment of the invention will now be described.

Figure 6:
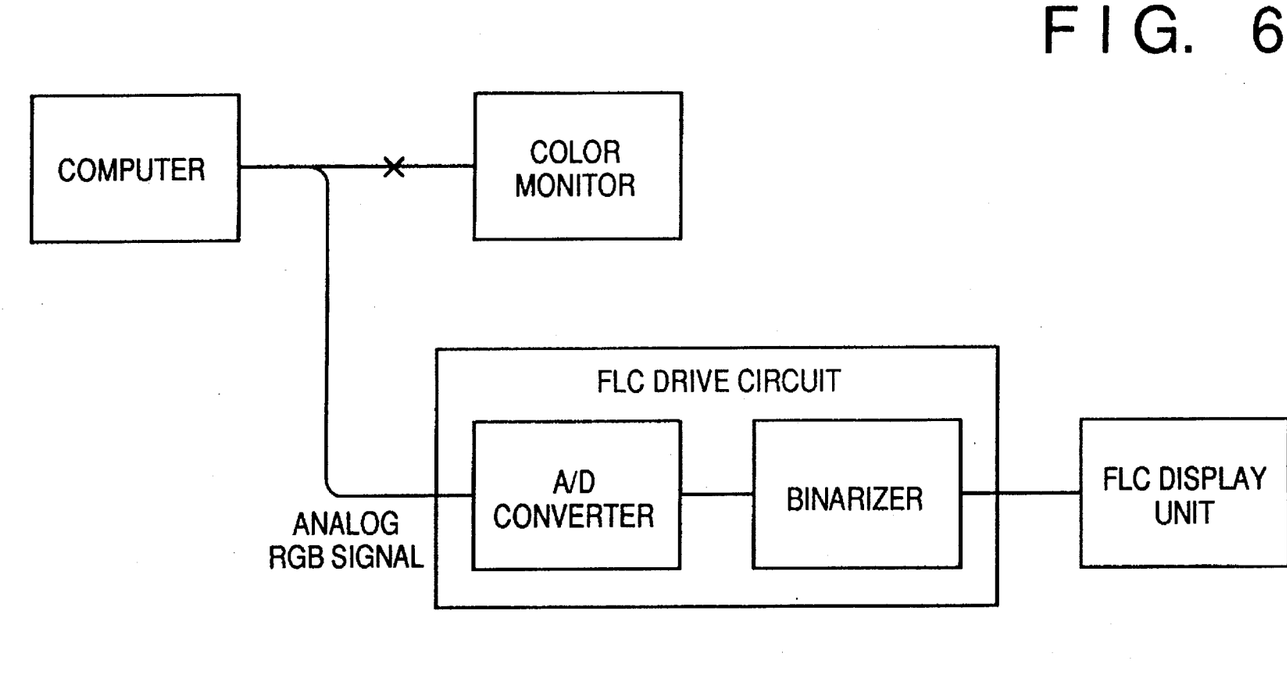
FIG. 6 is a block diagram illustrating a system configuration according to a third embodiment of the present invention.

FIG. 6 illustrates the connection relationship between an FLC drive circuit and a computer according to the third embodiment. The purpose of this embodiment is to display an analog image signal on an FLC display device; the embodiment cannot be applied when a digital image signal from a computer is displayed.

Figure 7:
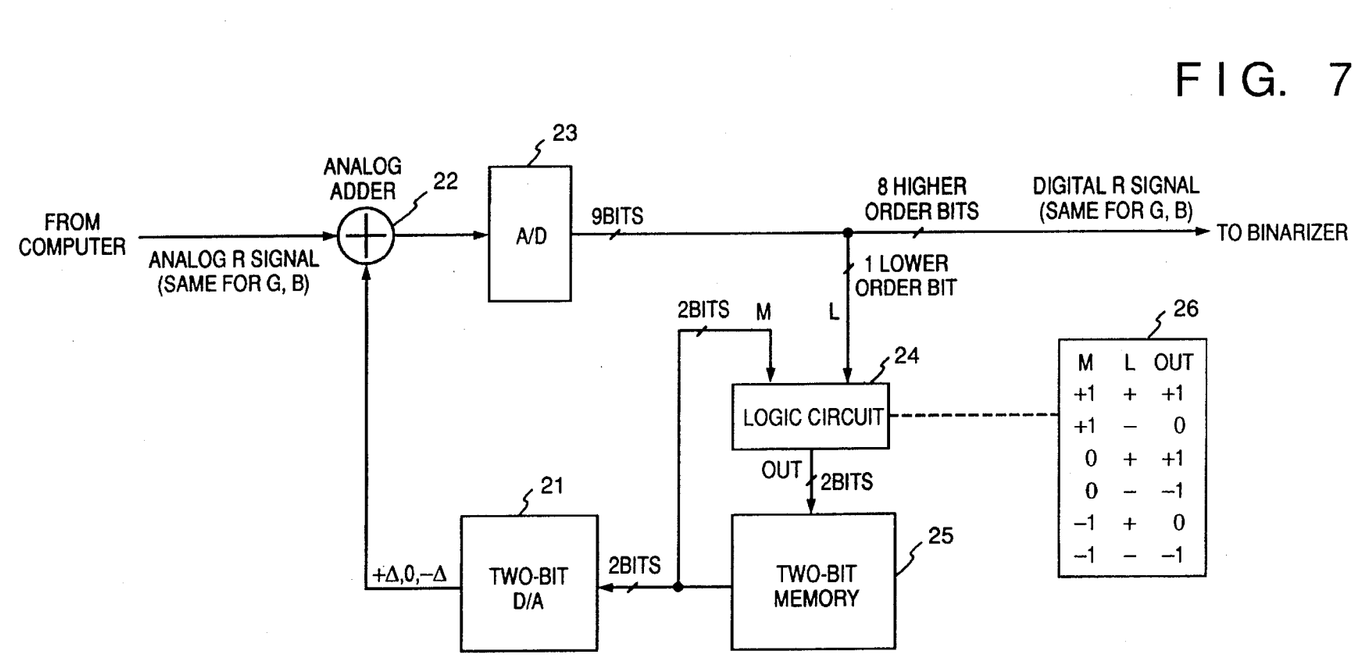
FIG. 7 is a block circuit showing the construction of an A/D converter circuit in FIG. 6.

FIG. 7 is a block diagram showing an apparatus for applying hysteresis between frames according to the third embodiment. This corresponds to the A/D converter circuit of FIG. 6. In FIG. 7, an analog input signal is for processing any one of R, G, B signals and is common for all of the R, G, B signals. For example, the result of adding an output +Δ, − or −Δ from a two-bit D/A converter circuit 21 to an input analog signal R by an analog adder circuit 22 is converted into a digital signal by an A/D converter 23. On the assumption that the number of A/D-converted quantization bits is nine (for values of 0–511), the input analog signal will be quantized to 512 levels. Hysteresis (Δ) to be added to or subtracted from this input analog signal preferably is less than one-fourth of one quantization level. Therefore, we have ¼=0.25.

The A/D converter 23 used has one bit more than the number of bits necessary for the required quantization level. For example, since 256 tones (eight bits) are displayed on the FLC in this embodiment, a nine-bit A/D converter is used. The digital image signal resulting from the A/D conversion is divided by two and transmitted to a binarizing (ED) circuit. That is, the eight higher order bits of the nine bits are introduced to the binarizing circuit.

Meanwhile, the least significant bit (L) of the A/D converter (namely the remainder after the aforementioned division by two) enters a logic circuit 24. Here a logical operation is performed between this bit and information (M) of one frame earlier that has been stored in a two-bit memory 25 (this does not mean that the capacity of this memory is two bits), which is for storing two-bit information regarding one pixel position. The output of the logic circuit 24 is written in the two-bit memory 25 within the same timing clock. The relationship between the inputs (L), (M) and output (Out) of the logic circuit 24 is as indicated at 26 in FIG. 7. Of the information stored in the two-bit memory 25, one bit is a sign bit and the other bit is a value, as indicated at 26.

The signal (L) enters the logic circuit 24 simply as sign information. Here 1 is minus and 0 is plus. The output (Out) of the logic circuit 24 has a shape the same as that of the input (M).

A value the same as that of signal (M) is applied to the two-bit D/A converter 21, which generates analog signals (+Δ), (0) and (−Δ) in correspondence with the values (+1), (0) and (−1), respectively, of M.

The operation of the apparatus for applying hysteresis between frames will now be described with reference to FIG. 8.

Figure 8:
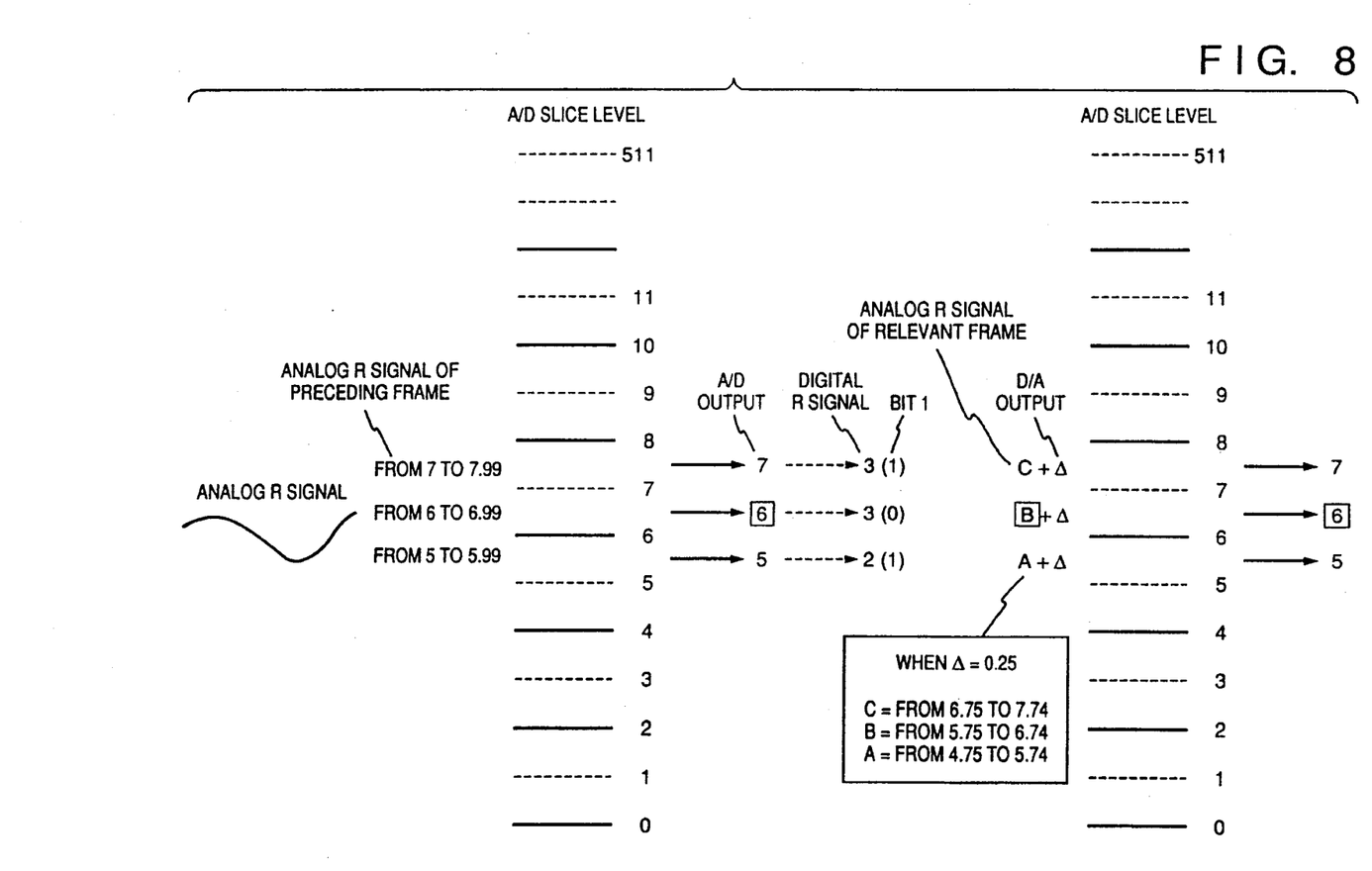
FIG. 8 is a diagram for describing the operation of the third embodiment.

In FIG. 8, consider a case in which the input analog signal is quantized to "6" when the output of the two-bit memory 25 is "0". An analog image signal of range "6"–"6.99" as the relative value of the input is quantized as "6". Here "x.99" following the decimal point is indicative of a value sufficiently near "x+1". Similarly, the relative value of the input analog signal when the signal is quantized as "5" is "5" to "5.99", and the relative value of the input analog signal when the signal is quantized as "7" is "7" to "7.99".

Since FIG. 8 is for a case in which the input analog signal is quantized as "6", this numeral is enclosed by a square box.

The A/D output is divided by two, and "6" is split into the quotient "3" and the remainder "0". (In actuality, "6" is merely separated into the eight higher order bits and the least significant bit.) The least significant bit enters the logic circuit 24 as the signal "L". The other input "M" to the logic circuit 24 is the very signal produced by the logic circuit itself one frame earlier.

When the least significant bit of the A/D converter circuit 23 is made the sign bit "L", the logic circuit 24 produces "+1" if the sign bit is "+" and "−1" if the sign bit is "−". However, ms produced when the sign "M" of the relevant pixel one frame earlier and the sign of the least significant bit "L" are of opposite polarity.

When the A/D output is "6" and the output "M" of the two-bit memory 25 is "0" the remainder "L" obtained when "6" is divided by two is "0" and the sign is positive (+). Therefore, in accordance with the truth table 26 of FIG. 7, the output of the logic circuit 24 is "+1". As a result, "+1" is written in the memory and, when the relevant pixel of the next frame is quantized, "+1" is outputted by the memory. This means that "+Δ" is added to the input analog image signal by the two-bit D/A converter 21.

When this is done, "+Δ" is added to the input analog signal A, B or C, as shown on the right half of FIG. 8. Therefore, in order to effect quantization to "7", "6" and "5", respectively, B should range from "5.75" to "6.74". This indicates that when the level of the relevant pixel of the analog image signal is judged to be in the range of "6" to "6.99" in the preceding frame, the level is discriminated to be "6" in the next frame, as in the manner of "5.75" to "6.74", even if a level signal that would discriminated originally to be "5" enters.

The value obtained by dividing the A/D converter output by two becomes three also when the A/D output is "7". However, since the least significant bit is "1", namely "−", at this time, the output of the logic circuit is "0" or "−1" in accordance with the truth table.

To sum up these operations, when the input analog image signal is between "6" and "7", the level of the relevant pixel of the next frame is shifted toward "8" by the amount Δ. Similarly, when the input analog image signal is between "7" and "8", the level of the relevant pixel of the next frame is shifted toward "6" by the amount Δ. As a result, even if the input image signal fluctuates up and down between frames by ±Δ about "6" as the center value, the value will always be judged to be "6" and never "5" if quantization to "6" is performed initially.

Accordingly, the present invention makes it possible to furnish hysteresis of amount Δ when the density level of an image signal varies gradually every frame. As a result, analog noise within ±Δ can be eliminated. Therefore, even if a motion picture is displayed continuously, a highly attractive image can be displayed even of portions in the picture that undergo almost no change.

In the foregoing embodiments, it has been described that the apparatus is interposed between a display unit and a computer. However, it goes without saying that the apparatus may be provided as a board attached to the main body of the computer or may be incorporated in the display unit itself. In addition, the apparatus may be connected to a video camera.

Further, the destination of the output from the apparatus of FIG. 8 may be a binarizing circuit that operates based upon the simple error-diffusion method.

Though a binary-image reproducing apparatus has been described as an example of the apparatus to which an output is applied, the apparatus may be that for a three-value image or higher.

Further, the memory 25 in the third embodiment need not be a two-bit memory but can have a larger number of bits. In other words, the amount of compensation can be set to a larger number of levels and not just the three levels of +Δ, −Δ and 0.

Though the error diffusion in the first embodiment is described by employing FIG. 1B, it goes without saying that the error diffusion can be realized using FIG. 1A, and it is obvious that other N-value-conversion processing may be utilized.

Thus, in accordance with the present invention as described above, it is possible to obtain an excellent image in which flickering of the image is suppressed even if an M-value image which enters continuously in frame units is outputted to an N-value display unit, where N<M holds.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

input means for entering image data frame by frame;

correcting means for applying hysteresis of image data of a preceding frame to image data of an entered present frame, to correct the present frame; and N-value converting means for subjecting the image data corrected by said correcting means to an N-value conversion in which the image data is converted to data having N bits per pixel, wherein said correcting means includes:

memory means for storing results of the N-value conversion of the preceding frame by said N-value converting means;

distributing means for distributing an error, which is produced at an N-value conversion of a pixel of interest contained in the present frame entered by said input means, to a group of pixels not yet subjected to the N-value conversion in the vicinity of said pixel of interest;

combining means for combining, at a prescribed ratio, an error, which has been distributed from a group of pixels already subjected to the N-value conversion, accumulated at the position of the pixel of interest contained in the entered present frame, and a weighted mean value based upon a prescribed number of items of N-value converted data in an area in said memory means corresponding to the position of said pixel of interest; and adding means for adding a value obtained by said combining means to the value of the entered pixel of interest.

2. The apparatus according to claim 1, wherein said input means enters M-value image data, which has M bits per pixel (where M>N holds).

3. The apparatus according to claim 2, wherein N is 2.

4. The apparatus according to claim 2, wherein the M-value image data entered by said input means is image data obtained by an analog-to-digital conversion.

5. The apparatus according to claim 1, wherein said distributing means includes:

error storing means in which a prescribed number of bits are allocated to one pixel, said error storing means having a capacity of one frame; and adding means for partitioning an error, which is produced when data of a pixel of interest is subjected to an N-value conversion, into values in accordance with weights of coefficient values within a predetermined matrix, and adding the partitioned values to values already stored at respective positions of a group of pixels not yet subjected to the N-value conversion in the vicinity of the position of the pixel of interest.

6. The apparatus according to claim 1, wherein said distributing means includes:

error storing means in which a prescribed number of bits are allocated to one pixel, said error storing means having a capacity of one frame;

storing means for storing an error, which is produced when data of a pixel of interest is subjected to an N-value conversion, at the position of said pixel of interest in said error memory means; and calculating means for multiplying, by individual coefficient values within a predetermined matrix, individual errors that have been stored at the positions of pixels already subjected to a binary conversion in the vicinity of the position of the pixel of interest, and calculating the total of individual results of multiplication.

7. An image processing apparatus to which analog-to-digital-converted M-value image data, which has M bits per pixel, is entered frame by frame for subjecting the image data to an N-value conversion, to produce data having N bits per pixel, by N-value converting means (where N<M holds), comprising:

memory means for storing results of N-value conversion of a preceding frame;

distributing means for distributing an error, which is produced at an N-value conversion of a pixel of interest contained in an entered present frame, to a group of pixels not yet subjected to the N-value conversion in the vicinity of said pixel of interest;

combining means for combining, at a prescribed ratio, an error accumulated by said distributing means at the position of the pixel of interest contained in the entered present frame, and a weighted mean value based upon a prescribed number of items of N-value converted data that have been stored at pixel positions in the vicinity of a position in said memory means corresponding to the position of said pixel of interest; and adding means for adding the value obtained by said combining means to the value of the entered pixel of interest, wherein results of addition by said adding means are subjected to the N-value conversion by said N-value converting means.

8. The apparatus according to claim 7, wherein N is 2 and said N-value converting means comprises error diffusion means.

9. The apparatus according to claim 7, wherein the size of a pixel area, which is referred to when the weighted mean value is calculated, having N-value converted data in said memory means is less than the size of a pixel area in which distribution is performed by said distributing means.

10. The apparatus according to claim 7, wherein said distributing means includes:

error storing means in which a prescribed number of bits are allocated to one pixel, said error storing means having a capacity of one frame; and adding means for partitioning an error, which is produced when data of a pixel of interest is subjected to an N-value conversion, into values in accordance with weights of coefficient values within a predetermined matrix, and adding the partitioned values to values already stored at respective positions of a group of pixels not yet subjected to the N-value conversion in the vicinity of the position of the pixel of interest.

11. The apparatus according to claim 7, wherein said distributing means includes:

error storing means in which a prescribed number of bits are allocated to one pixel, said error storing means having a capacity of one frame;

storing means for storing an error, which is produced when data of a pixel of interest is subjected to an N-value conversion, at the position of said pixel of interest in said error memory means; and calculating means for multiplying, by individual coefficient values within a predetermined matrix, individual errors that have been stored at the positions of pixels already subjected to a binary conversion in the vicinity of the position of the pixel of interest, and calculating the total of individual results of multiplication.

12. The apparatus according to claim 7, wherein said combining means combines the error accumulated at the position of the pixel of interest by said distributing means at a ratio greater than the weighted mean value.

13. The apparatus according to claim 7, further comprising output means for outputting image data, which has been N-value converted by said N-value converting means, to a prescribed N-value image display unit.

14. An image processing apparatus comprising:

input means for entering analog image data frame by frame;

analog-to-digital converting means for converting one pixel contained in analog image data entered by said input means into L bits of digital pixel data;

output means for outputting M (M<L) higher order bits of the pixel data, which has been converted by said converting means, to prescribed N-value converting means (N<M) which is for converting the data to data having N bits per pixel;

memory means for storing P (P=L−M) lower order bits of the pixel data, which has been converted by said converting means, as a hysteresis value applied to a pixel at a corresponding position of the next frame; and adding means for adding analog data, which is based upon the hysteresis value, of the corresponding pixel position in the present frame entered by said input means.

15. The apparatus according to claim 14, wherein P is equal to 1.

16. The apparatus according to claim 15, wherein said memory means includes:

a memory in which two bits are allocated to one pixel, said memory having a capacity of one frame; and correcting means for making one lower order bit of the pixel data, which has been converted by said converting means, a sign bit, and correcting two bits having sign, which have been stored the preceding time, by said sign bit.

17. The apparatus according to claim 14, wherein said N-value converting means comprises binarizing means.

18. An image processing apparatus comprising:

memory means for storing the results of N-value (N≧2) conversion of first frame image data, in which conversion the first frame image data was converted into data having N bits per pixel;

input means for inputting second frame image data; and conversion means for converting the second frame image data inputted by said input means into N-value image data, having N bits per pixel, by using a conversion method for converting frame image data in such a manner as to preserve the density of the entire frame image data, wherein said conversion means converts the second frame image data into N-value image data on the basis of the results of conversion of the first frame image data, stored in said memory means, and the second frame image data.

19. An image processing apparatus according to claim 18, wherein said memory means stores the results of binary-value conversion of the first frame image data, and said conversion means converts the second frame image data to binary image data.

20. An image processing apparatus according to claim 19, wherein said conversion means corrects the image data of the second frame image in such a manner that the difference between the binary image data of the first frame image and the binary image data of the second frame image is reduced.

21. An image processing apparatus comprising:

memory means for storing the results of N-value (N≧2) conversion of first frame image data, which conversion comprises converting the first frame image data into data having N bits per pixel;

input means for inputting second frame image data;

conversion means for subjecting the second frame image data inputted by said input means to a conversion process to convert the inputted frame data into N-value image data, having N bits per pixel; and displaying means for displaying an image on the screen of a ferrodielectric liquid device on the basis of the N-value frame image converted by said conversion means, wherein said conversion means converts the second frame image data into N-value image data on the basis of the results of the conversion of first frame image data, stored in said memory means, and the second frame image data.

22. An image processing apparatus according to claim 21, wherein said memory means stores the results of binary-value conversion of the first frame image data, and said conversion means converts the second frame image data to binary image data.

23. An image processing apparatus according to claim 22, wherein said conversion means corrects the image data of the second frame image in such a manner that the difference between the binary image data of the first frame image and the binary image data of the second frame image is reduced.

24. An image processing apparatus according to claim 21, wherein said conversion means converts the second frame image data inputted by said input means into N-value image data by using a conversion method which is capable of preserving density of entire image.

25. An image processing method comprising the steps of:

storing the results of N-value (N≧2) conversion of first frame image data, which conversion converts the first frame image data into data having N bits per pixel;

inputting second frame image data; and converting the frame image data inputted in said inputting step into N-value image data, having N bits per pixel, by using a conversion method for converting frame image data in such a manner as to preserve the density of the entire frame image data, wherein, in said converting step, the second frame image data is converted into N-value image data on the basis of the results of conversion of the first frame image data, stored in said storing step, and the second frame image data.

26. An image processing method comprising the steps of:

storing the results of N-value (N≧2) conversion of first frame image data, which conversion converts the first frame image data into data having N bits per pixel;

inputting second frame image data;

converting the frame image data inputted in said inputting step into N-value image data, having N bits per pixel; and displaying an image on the screen of a ferrodielectric liquid device on the basis of the N-value frame image data converted in said converting means, wherein said conversion means converts the second frame image data into N-value image data on the basis of the results of conversion of first frame image data, stored in said memory means, and the second frame image data.

* * * * *

UNITED STATES PATENT AND TRADEMARK OFFICE
CERTIFICATE OF CORRECTION

PATENT NO. : 5,570,461
DATED : October 29, 1996
INVENTOR(S) : YOSHIKAZU YOKOMIZO It is certified that error appears in the above-indentified patent and that said Letters Patent is hereby corrected as shown below:

<u>COLUMN 5</u>:

Line 10, "from 0" should read --from--.

<u>COLUMN 6</u>:

Line 32, "an" should read --a--.

<u>COLUMN 7</u>:

Line 63, "ms" should read --"0" is--.

Signed and Sealed this

Eighth Day of July, 1997

Attest:

BRUCE LEHMAN

*Attesting Officer*      *Commissioner of Patents and Trademarks*